United States Patent [19]
Patel et al.

[11] Patent Number: 5,585,430
[45] Date of Patent: Dec. 17, 1996

[54] PINTLE WIRE

[75] Inventors: Sanjay Patel, Summerville, S.C.; Robert L. Crook, Wilson, N.C.

[73] Assignee: Scapa Group PLC, Lancashire, United Kingdom

[21] Appl. No.: 523,863

[22] Filed: Sep. 6, 1995

Related U.S. Application Data

[63] Continuation-in-part of Ser. No. 301,983, Sep. 6, 1994, abandoned.

[51] Int. Cl.$^6$ ..................................................... C08K 3/10
[52] U.S. Cl. ..................... 524/406; 524/418; 524/419; 524/435; 524/445; 524/447; 524/495; 524/496
[58] Field of Search ................................ 524/495, 496, 524/406, 418, 419, 435, 445, 447

[56] References Cited

U.S. PATENT DOCUMENTS

| | | | |
|---|---|---|---|
| 4,007,303 | 2/1977 | Schuster et al. | 427/296 |
| 4,607,073 | 8/1986 | Sakashita et al. | 524/404 |

*Primary Examiner*—Edward J. Cain
*Attorney, Agent, or Firm*—Keck, Mahin & Cate

[57] ABSTRACT

A pintle wire comprises a polymer material containing a lubricant material of schistose nature. The polymer material comprises polyamide, polyester, copolyester, polyetheretherketone or polyphenylene sulphide. The schistose lubricant comprise graphite, molybdenum sulphide, cobalt sulphide, clay or silicate.

7 Claims, No Drawings

PINTLE WIRE

CROSS-REFERENCE TO RELATED APPLICATIONS

This application is a continuation-in-part application of Ser. No. 08/301,983, filed Sep. 6, 1994, now abandoned.

FIELD OF THE INVENTION

The present invention relates to a pintle wire, particularly but not exclusively for use in joining the ends of industrial fabrics, such as papermachine clothing, for example press felts and dryer fabrics.

BACKGROUND OF THE INVENTION

It is known to join together two ends of a fabric using a pintle wire so as to provide an endless belt. Each end of the fabric is provided with outwardly extending loops, the two sets of loops being interdigitable and capable of union by a pintle wire. As these joints can be up to 10 meter in length it will be appreciated that it is difficult to pass the pintle wire down the length of the tunnel defined by the interdigitated loops due to friction between the wire and the loops. Furthermore there may be significant yarn to yarn abrasion of the pintle wire and loops whilst the fabric is running on the papermachine.

It is known to coat pintle wires with a resin coating in order to reduce abrasion of the pintle wire. However, the coating undesirably increases the rigidity of the wire. It is also difficult to obtain a uniform coating on the pintle wire and to obtain good adhesion of the resin to the wire.

SUMMARY OF THE INVENTION

The present invention seeks to provide an alternative solution to the aforementioned problems.

According to the present invention there is provided a pintle wire comprising polymer formed by extrusion and containing a lubricant material of schistose nature.

DETAILED DESCRIPTION OF THE PREFERRED EMBODIMENTS

Schistose materials are materials, such as minerals, which comprise a network of weakly bonded infinite molecular layers. Examples of such materials include graphite, molybdenum sulphide, cobalt sulphide, clays and silicates such as talc or vermiculite. Graphite is preferred. This is because graphite offers superior yarn to yarn abrasion resistance. Tests have shown that graphite is significantly superior to molybdenum sulphide in this respect. The specific surface area (BET value) of the schistose material is preferably at least 12 $m^2/g$ and is most preferably 16 to 2 $m^2/g$. Materials having such a high BET value provide a greater polymer-graphite contact area, thus increasing the elongation at break of the pintle wire. Small surface area particles behave as fillers and their random orientation makes the pintle wire more brittle. The large surface area particles, however, are not so brittle in that the particles become orientated in the length direction of the pintle wire.

The polymer may comprise any of the following: polyamides such as Nylon, for example type PA6, PA6.6, PA6.10, PA6.12, polyesters, copolyesters, polyetheretherketone or polyphenylene sulphide or polyolefins.

Preferably no more than 3% of schistose lubricant material and more preferably no more than 1% of schistose lubricant by weight of the polymer is added to the polymer.

The wires of the invention may be formed from the polymer mixture by standard extruding techniques.

The impregnated pintle wires of the invention are more easily inserted into the tunnel of interdigitated loops because of reduced drag and friction as the wire passes through the loops. The wires of the invention also exhibit reduced distortion and lead to reduced distortion of the interdigitated loops.

The impregnated wires preferably provide a visual contrast with the belt, for example graphite impregnated wires are black whereas press felts are usually brown or white. The visual contrast makes it easier to insert the wire in the tunnel of loops.

A further advantage is that yarn to yarn abrasion of the wire and loops is less than that for conventional pintle wares. For example, at a speed of 32 cm/s a pintle wire comprising Nylon 6.10 impregnated with about 1 wt % graphite gave a fibre-fibre friction coefficient of 0.09 compared with 0.11 for neat Nylon 6.10 and 0.12 for Nylon 6.10 impregnated with about 1 wt % Teflon or molybdenum sulphide.

We claim:

1. A polymeric pintle wire formed by extrusion and containing a lubricant material of schistose nature, wherein the lubricant material has a BET value of at least 12 $m^2/g$.

2. A pintle wire as claimed in claim 1, wherein the lubricant material comprises at least one member selected from the group consisting of: graphite, molybdenum sulphide, cobalt sulphide, clay and silicate.

3. A pintle wire as claimed in claim 1, wherein the lubricant material comprises graphite.

4. A pintle wire as claimed in claim 1, wherein the polymer comprises at least one member selected from the group consisting of: polyamide, polyester, copolyester, polyolefin, polyetheretherketone and polyphenylene sulphide.

5. A pintle wire as claimed in claim 1, wherein the wire comprises no more than 3% of lubricant material by weight of the polymer.

6. A pintle wire as claimed in claim 5, wherein the wire comprises no more than 1% of lubricant material by weight of the polymer.

7. A pintle wire as claimed in claim 1, wherein the lubricant material has a BET value in the range from 16 to 22 $m^2/g$.

* * * * *